United States Patent [19]

Diehl

[11] Patent Number: 5,792,281
[45] Date of Patent: Aug. 11, 1998

[54] POST-MIXED CUTTING TORCH HAVING A PILOT MODE AND METHOD OF OPERATING SAME

[75] Inventor: Gregory William Diehl, Florence, S.C.

[73] Assignee: The ESAB Group, Inc., Florence, S.C.

[21] Appl. No.: 910,789

[22] Filed: Aug. 13, 1997

[51] Int. Cl.$^6$ ...................................................... B23K 7/00
[52] U.S. Cl. ................................ 148/205; 148/194; 266/48; 266/77
[58] Field of Search ......................... 266/48, 76, 77, 266/902; 148/194, 205

[56] References Cited

U.S. PATENT DOCUMENTS

| | | | |
|---|---|---|---|
| 2,095,789 | 10/1937 | Bucknam | 266/48 |
| 3,299,939 | 1/1967 | Marra, Sr. | 266/48 |
| 3,604,631 | 9/1971 | Etter | 266/48 |
| 3,627,457 | 12/1971 | Roder | 266/48 |
| 3,788,558 | 1/1974 | Ujiie et al. | 266/48 |
| 3,948,496 | 4/1976 | Miller | 266/48 |
| 4,455,176 | 6/1984 | Fuhrhop | 148/196 |
| 4,818,220 | 4/1989 | Kobayashi | 431/264 |
| 5,383,650 | 1/1995 | Bissonnette | 266/48 |
| 5,390,855 | 2/1995 | Mims et al. | 239/414 |
| 5,470,227 | 11/1995 | Mims et al. | 266/48 |
| 5,700,421 | 12/1997 | Bissonnette | 266/48 |

*Primary Examiner*—Scott Kastler
*Attorney, Agent, or Firm*—Bell Seltzer Intellectual Property Law Group of Alston & Bird, LLP

[57] ABSTRACT

A post-mixed cutting torch selectively operable in a pilot mode and a cutting mode is provided by the present invention. The control body includes a fuel passage and an oxygen passage which is divided into a preheat oxygen supply branch and a cutting oxygen supply branch. A fuel flow valve is provided in the fuel passage and an oxygen flow valve is provided in the cutting oxygen supply branch of the oxygen passage. Advantageously, an interconnecting passage extends between the preheat oxygen supply branch and the cutting oxygen supply branch. Accordingly, the torch is operable in a preheat/cutting mode wherein oxygen is directed through both the preheat and cutting oxygen apertures of a cutting nozzle. In addition, each of the fuel and oxygen flow valves is associated with a bypass channel which allows the torch to be operable in a fuel saving pilot mode wherein oxygen is directed through both the preheat and cutting oxygen apertures of a cutting nozzle.

23 Claims, 10 Drawing Sheets

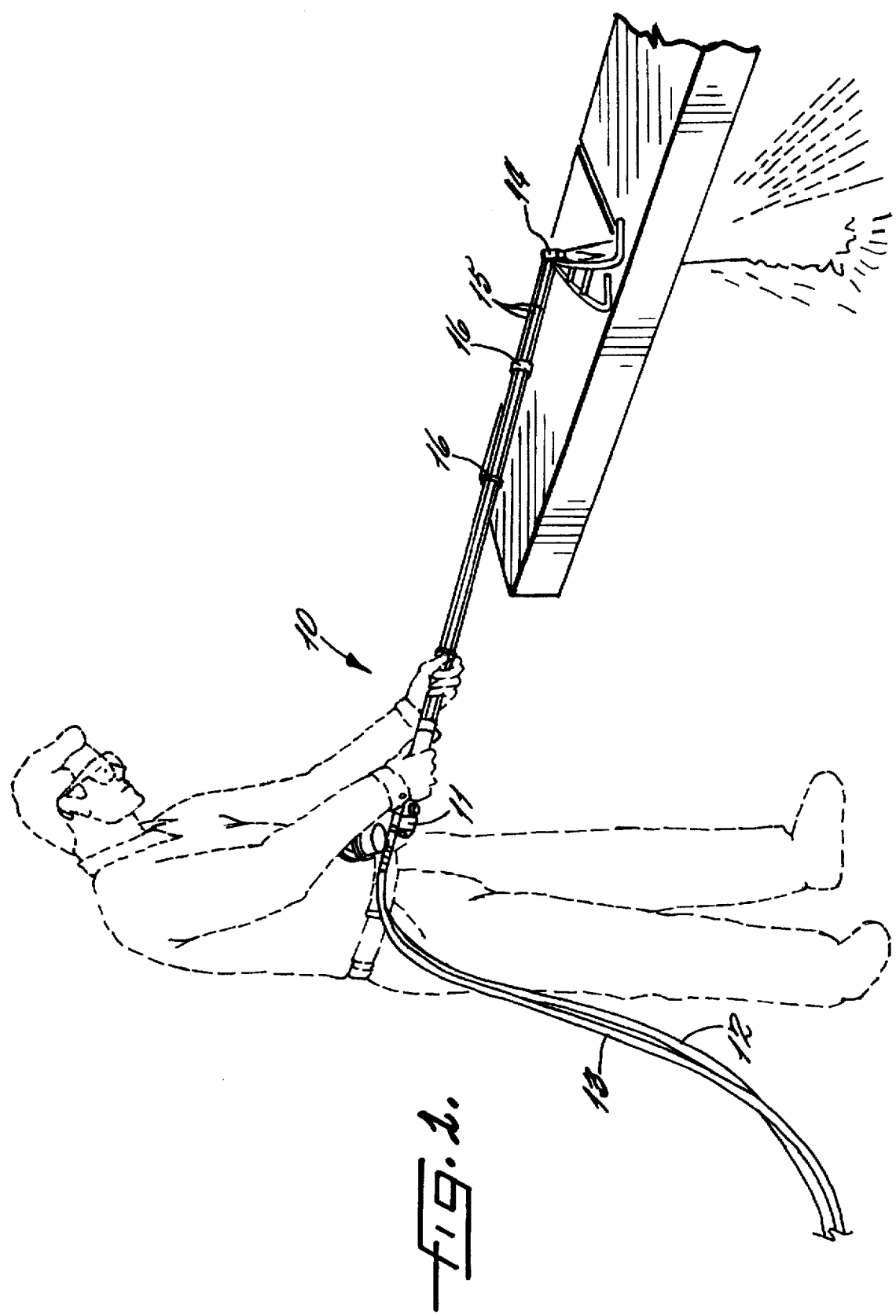

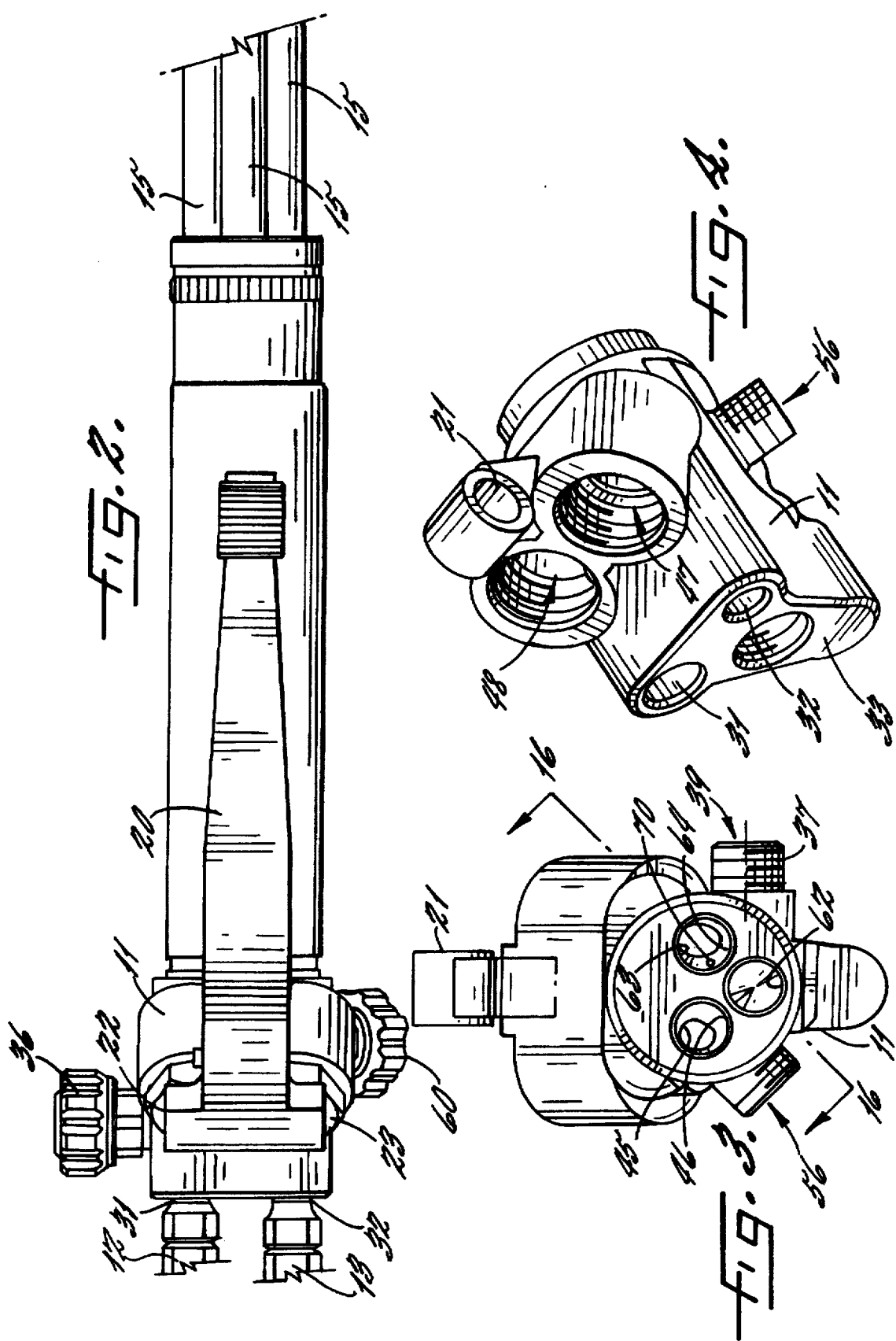

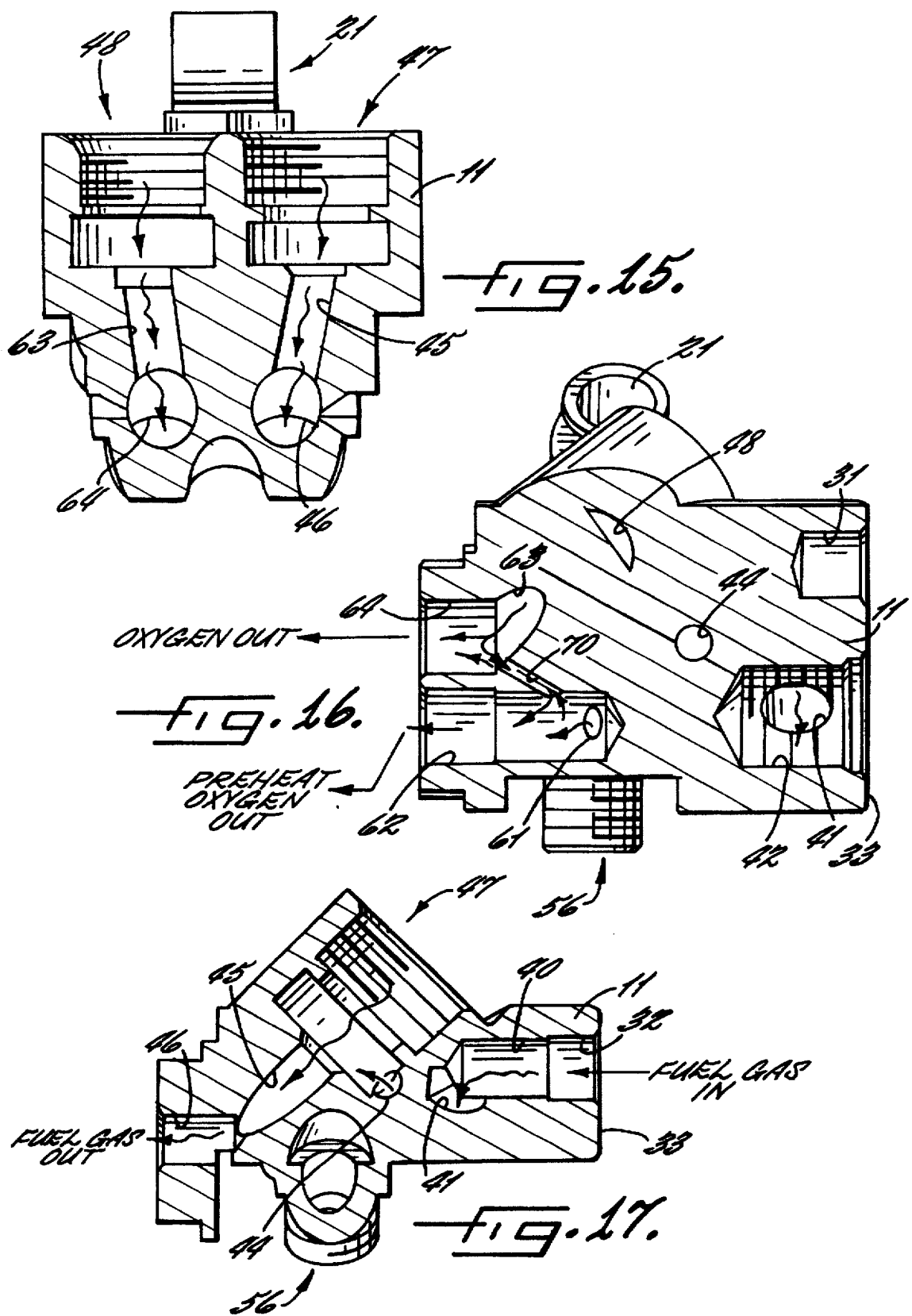

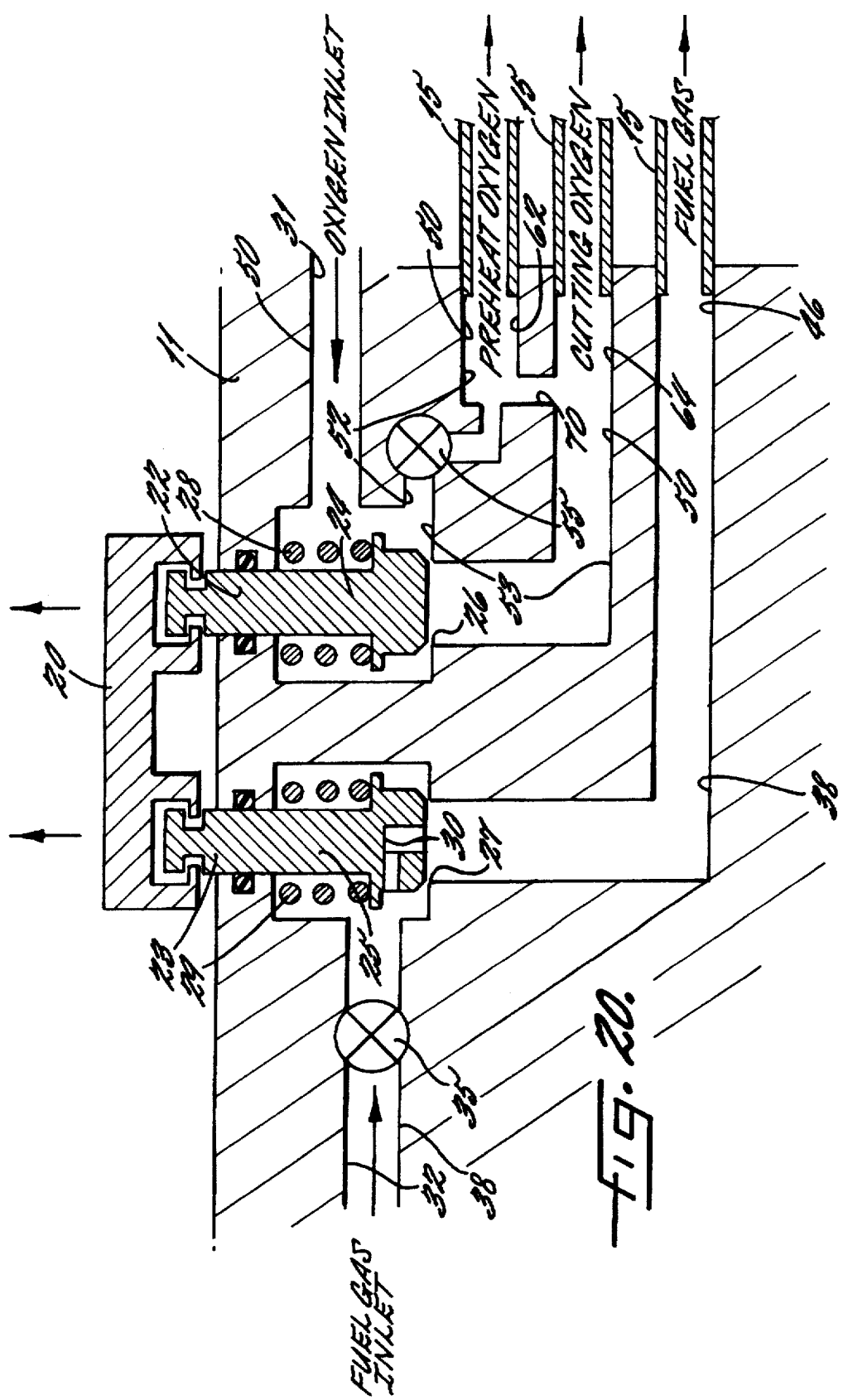

POST-MIXED CUTTING TORCH HAVING A PILOT MODE AND METHOD OF OPERATING SAME

FIELD OF THE INVENTION

The present invention relates to cutting torches, and more particularly relates to post-mixed cutting torches.

BACKGROUND OF THE INVENTION

Oxy-fuel cutting torches combine flows of fuel gas and oxygen at a nozzle which are then ignited and employed to cut metal products. Such torches can be described as either machine mounted or handheld. Machine mounted torches are torches that are mounted remote from operating personnel and can operate at higher temperatures and gas flow volumes (and generally with more controlled cutting patterns) than handheld torches. However, handheld torches are more portable and can therefore be more versatile in their cutting applications. For example, handheld torches can be used to dismantle intricate or other structures which may be difficult to reach with a machine mounted torch, including railroad cars, metal slabs, building structural support beams, and even metal hulls and such as found on ocean going vessels.

A typical torch includes a control body operably associated with separate fuel gas and oxygen supplies, a remotely located cutting nozzle, and several tubes positioned between the nozzle and control body which carry the oxygen and fuel gas to the nozzle. Conventional torches first generate a preheat flame which heats the targeted metal. After the preheat flame has heated the targeted product sufficiently, a high velocity cutting oxygen stream is then activated and delivered through the nozzle. The high velocity cutting oxygen stream physically removes the molten material by oxidation, thus cutting the metal. Typically, a number of valves and related components are provided upstream of the nozzle to control same and introduce the cutting oxygen after the workpiece has been sufficiently preheated.

Oxy-fuel torches can be further described as "post-mixed" or "premixed" cutting torches. "Premixed" indicates that the fuel gas and oxygen are mixed inside the torch such that they ignite upon exit from the torch. In contrast, a "post-mixed" torch does not mix the oxygen and fuel gases until after they exit the nozzle.

Some torches employ a gas-saving feature known as a pilot mode wherein a small flame is sustained at the cutting nozzle when the torch is not in active use. For example, a pilot mode is desirable in situations where a handheld cutting torch is used only intermittently but may be needed on short notice, such as when machine torches in an automated steel mill fail and quick cutting of the steel product is necessary to avoid shutting down the mill.

U.S. Pat. No. 5,383,650 to Bissonnette proposes a torch with a pilot mode having three separate flow control valves, one for each of the fuel gas, cutting oxygen, and preheat oxygen; the configuration complementing the conventional preheat and cutting oxygen operations described above. Both of the fuel gas and preheat oxygen flow control valves are constructed with pilot bores to allow a small flow of fuel and oxygen through the valves to maintain a pilot flame. Before cutting a workpiece, the fuel and preheat oxygen flow control valves are opened to form a preheat flame for preheating the workpiece. The cutting oxygen flow control valve is then opened to initiate a cutting flame. Such valves are expensive, however, and it is desirable to reduce the number of valves necessary for cost and complexity reasons and, with handheld torches, to reduce the weight of the control assembly.

It has been discovered in connection with certain machine mounted torches that it is not always necessary to have separate preheat and cutting modes. For example, U.S. Pat. No. 4,455,176 to Fuhrhop discloses a cutting nozzle for machine mounted applications which includes a central bore for cutting oxygen, a plurality of fuel passageways radially spaced from the central bore and a plurality of preheat oxygen passageways surrounding the fuel passageways. The patent further discloses that the preheat oxygen and cutting oxygen may be supplied from a common cutting oxygen supply conduit and that an unillustrated passageway could connect the central bore to an annular distribution chamber for the preheat oxygen passageways. However, the contemplated passageway would be formed in the nozzle, which adds to the complexity and cost of the nozzle. This is especially disadvantageous with cutting nozzles because the nozzles typically have a limited life span relative to remainder of the torch. In addition, the Fuhrhop patent does not provide for a pilot mode whereby substantial gas savings can be realized.

Accordingly, there is a need in the industry for a post-mixed torch design which is operable in both a cutting mode and a pilot mode to effect great fuel savings without the need to relight the torch before each cutting operation. In addition, such a torch would be advantageously operable without separate preheating and cutting modes and without a commensurate increase in nozzle cost and complexity.

SUMMARY OF THE INVENTION

These and other advantageous objectives are accomplished by the cutting torch according to the present invention having a control body with a fuel flow valve and only one oxygen flow valve which, when closed, allow operation in a pilot mode because of a bypass channel associated with each of the valves and which, when opened, allow operation in a combined preheat/cutting mode. A passage interconnects the flow of preheat oxygen and cutting oxygen in the control body upstream of the torch nozzle such that oxygen flows through both the cutting oxygen and preheat oxygen apertures in the nozzle during both the pilot mode and the preheat/cutting mode.

More particularly, the invention comprises in one aspect a post-mixed cutting torch which is selectively operable in a pilot mode and preheat/cutting mode. The control body has an oxygen inlet and a fuel inlet each configured to engage with respective ones of an oxygen supply and a fuel supply. The control body also has a preheat oxygen outlet, a cutting oxygen outlet, and a fuel outlet. A plurality of passages extends between the various inlets and outlets.

One such passage is an oxygen passage having first and second ends wherein the first end is in fluid communication with the oxygen inlet and the second end includes a preheat oxygen supply branch which terminates at the preheat oxygen outlet and a cutting oxygen supply branch which terminates at the cutting oxygen outlet. The interconnecting passage discussed above is disposed between and connects the preheat oxygen supply branch and the cutting oxygen supply branch in the control body. An oxygen throttle valve is positioned in the preheat oxygen supply branch upstream of the interconnecting passage for adjusting the flow of oxygen through the preheat oxygen supply branch. A fuel passage extends between the fuel inlet and the fuel outlet.

An oxygen flow valve is positioned in the oxygen passage for controlling the flow of oxygen therethrough. In particular, the oxygen flow valve is positioned in the cutting oxygen supply branch and the oxygen bypass channel comprises at least part of the preheat oxygen supply branch and the interconnecting passage. The oxygen flow valve has a cutting mode where the valve is opened and a pilot mode where the oxygen valve is closed. When the oxygen valve is closed a restricted flow of oxygen is bypassed through an oxygen bypass channel having an upstream end on an upstream side of the oxygen flow valve and a downstream end on the downstream side.

A fuel flow valve is positioned in the fuel passage. The fuel flow valve has a cutting mode where the valve is opened and a pilot mode where the valve is closed. A restricted flow of fuel is bypassed through a fuel bypass channel when the fuel flow valve is closed. The fuel bypass channel has an upstream end on an upstream side of the fuel flow valve and a downstream end on a downstream side of the valve. In one embodiment, the fuel bypass channel is a pilot bore of predetermined size which extends through the fuel flow valve. The fuel passage includes a fuel throttle valve upstream of the fuel valve.

A cutting nozzle is connected to the control body and has at least one preheat oxygen aperture supplied by the preheat oxygen outlet, at least one cutting oxygen aperture supplied by the cutting oxygen outlet and at least one fuel aperture supplied by the fuel outlet. In one embodiment, the cutting oxygen aperture comprises a central aperture in the nozzle, the fuel aperture comprises a plurality of annular apertures radially spaced from the central cutting oxygen aperture, and the preheat oxygen aperture comprises a plurality of annular apertures radially spaced outwardly from the fuel apertures.

Three substantially rigid tubes advantageously extend between and connect each of the preheat, cutting oxygen and fuel outlets of the control body with the respective apertures in the nozzle. The tubes are arranged in a triangular truss configuration and are fastened together at at least one point between the control body and the nozzle for structural rigidity.

The cutting torch further includes a cutting lever attached to both the oxygen flow valve and fuel flow valve such that the valves are opened substantially simultaneously by the cutting lever. The valves may be opened exactly simultaneously or with one, such as the fuel flow valve, opened slightly ahead of the other.

An associated method also forms a part of the present invention and includes the step of operating the torch in a pilot mode. The operation of the torch in the pilot mode includes directing a predetermined restricted flow of fuel through at least one annular fuel aperture of a cutting nozzle. A predetermined restricted flow of oxygen is directed through at least one central cutting oxygen aperture of the nozzle which is concentrically within the fuel aperture. In addition, a predetermined restricted flow of oxygen is directed through at least one outer annular preheat oxygen aperture which is concentrically outside of the annular fuel aperture. The predetermined flows of fuel and oxygen are then ignited to create a pilot flame.

The torch may then be operated in a cutting mode which includes the steps of opening a fuel valve for directing a larger predetermined flow of fuel through the annular fuel aperture and opening an oxygen valve for directing a larger predetermined flow of oxygen through both the central cutting oxygen aperture and outer annular preheat oxygen aperture. The cutting nozzle is then positioned adjacent to a workpiece during the cutting mode to thereby cut the workpiece. In one embodiment, the steps of opening the fuel valve and oxygen valve are performed simultaneously. In another embodiment, the opening of the fuel flow valve is performed slightly before the step of opening the oxygen flow valve.

BRIEF DESCRIPTION OF THE DRAWINGS

Some of the objects and advantages of the invention have been set forth and other objects and advantages of the invention will become apparent in the detailed description of the preferred embodiments of the invention to follow, when taken in conjunction with the accompanying drawings, which are not necessarily drawn to scale:

FIG. 1 is an environmental perspective view illustrating the use of a cutting torch according to the present invention;

FIG. 2 is a top view of a cutting torch control body assembly according to the present invention;

FIG. 3 is an end view of the control body of the cutting torch;

FIG. 4 is a perspective view of the control body according to the present invention;

FIG. 15 is a sectional view taken along lines 15—15 of FIG. 6;

FIG. 16 is a sectional view taken along lines 16—16 of FIG. 3;

FIG. 17 is a sectional view taken along lines 17—17 of FIG. 7;

FIG. 18 is an end view of a cutting nozzle used in connection with the present invention;

FIG. 19 is a sectional view of the cutting nozzle taken along lines 19—19 of FIG. 18;

FIG. 20 is a schematic illustration of the interconnection of the various passages of the control body.

DETAILED DESCRIPTION OF THE PREFERRED EMBODIMENTS

Figure 5:
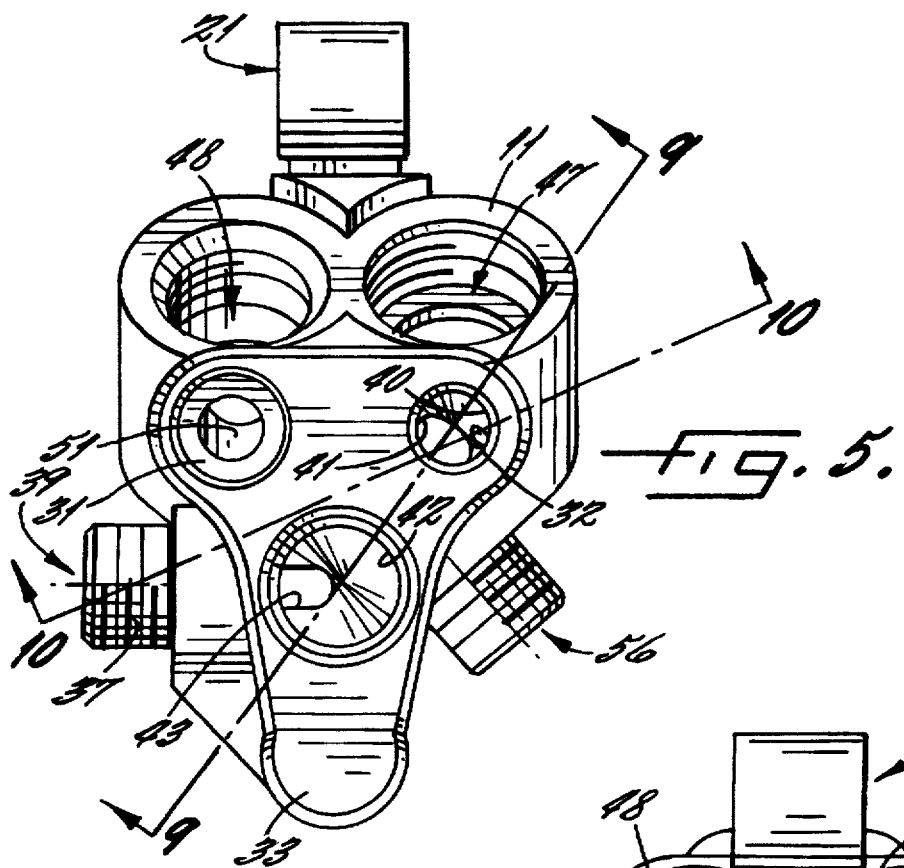
FIG. 5 is an end view of the control body opposite the end of FIG. 3 and illustrating the oxygen inlet and fuel inlet.
Figure 6:
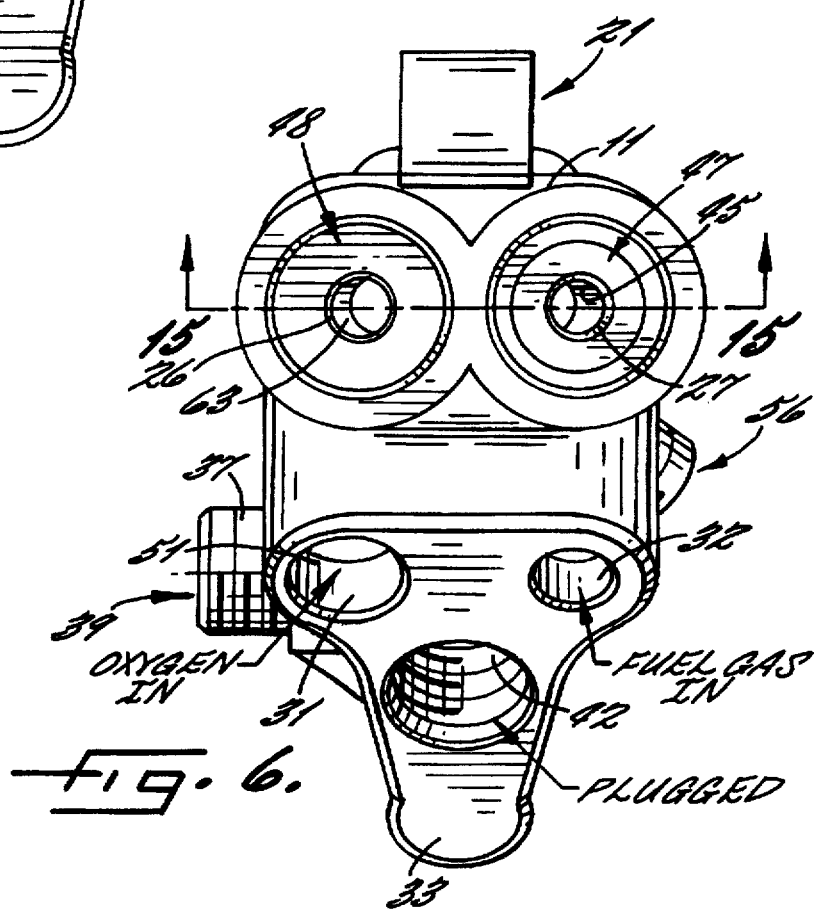
FIG. 6 is a inclined top view of the control body illustrating the positions of the oxygen flow valve and fuel flow valve.
Figure 7:
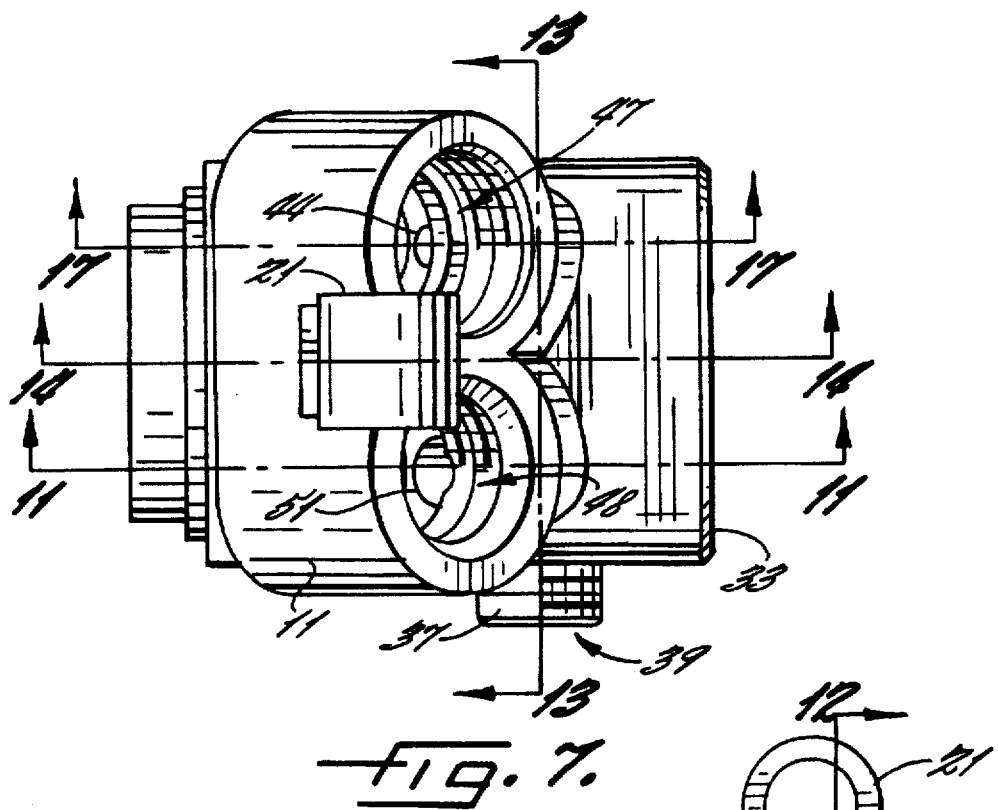
FIG. 7 is a top view of the control body.
Figure 8:
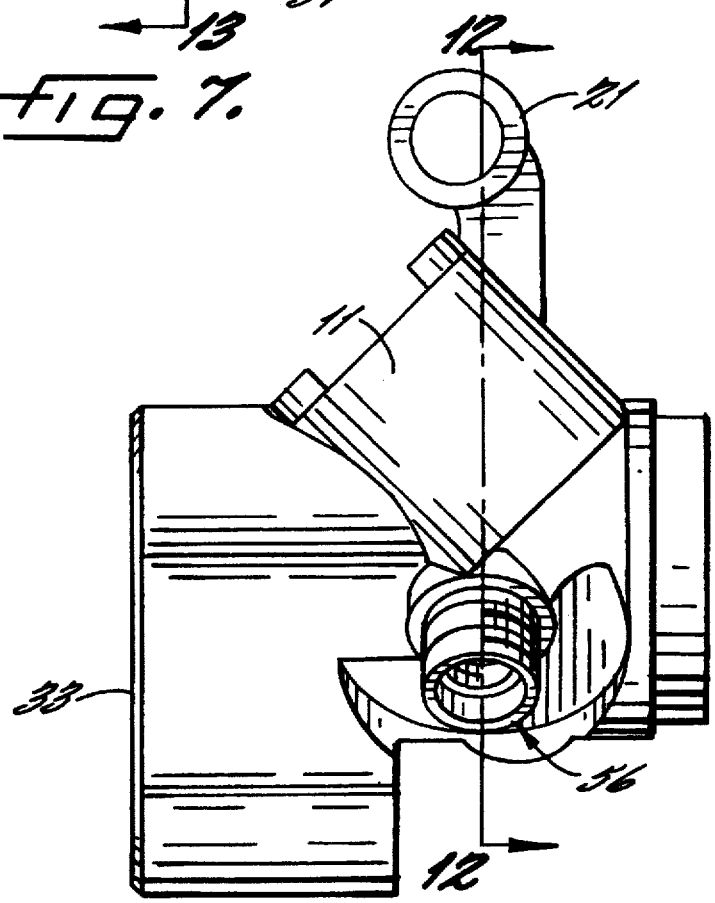
FIG. 8 is a side view of the control body.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

The use of a cutting torch 10 according to the present invention is illustrated in FIG. 1. The cutting torch 10 includes a control body assembly 11 which regulates the flow of fuel gas and oxygen from an oxygen supply hose 12 and a fuel supply hose 13. From the control body 11, the gases are directed to a cutting nozzle 14 which directs the gases in the direction of the workpiece. When ignited, the gases produce a very hot flame for cutting the workpiece. Steel workpieces as thick as 24 inches or thicker, depending on the type of nozzle and gas flow capacity, can be cut with the cutting torch 10 illustrated in FIG. 1.

With torches of this size, it is often desirable to provide a long boom for the cutting torch 10 to separate the operator from the cutting flame. According to one aspect of the present invention, three substantially rigid tubes 15 supply the gases to the cutting nozzle 14 and separate the control body 11 from the nozzle. The tubes are fastened together with at least one gusset 16 or other connecting member between the control body 11 and the nozzle 14 for forming a triangular truss configuration having sufficient structural rigidity.

FIG. 2 illustrates the control body assembly 11 and a cutting lever 20 attached to the control body. The cutting lever 20 is pivotally mounted in an opening 21 in the control body 11 such that, when the cutting lever is depressed by the operator, an oxygen flow valve 22 and a fuel flow valve 23 are pulled outwardly from the control body to open the valves.

FIG. 20 further illustrates the operation of the valves and includes a schematic overview of the various passageways of the control body which are discussed in more detail below. As can be seen, the cutting lever 20 causes the stem 24,25 of the respective valve to be withdrawn from the corresponding valve seat 26,27. The withdrawal of the valve stems 24,25 is reacted against by a respective coil spring 28,29. The valves 22,23 are of conventional design as known in the art with the exception of a pilot bore formed in the fuel valve stem 25 which is discussed in more detail below.

The control body 11 according to the present invention will now be described with reference to the schematic illustration of FIG. 20 which illustrates in simplified form the interconnection of the various passages of the control body. An actual embodiment of the control body is illustrated in FIGS. 3–17 and includes many various overlapping and intercepting passageways. As such, the invention will be most easily understood in connection with FIG. 20, but FIGS. 3–17 will be referred to where appropriate to gain a more complete understanding of the invention.

The control body 11 includes an oxygen inlet 31 and fuel inlet 32, each of which is connected to the respective supply hose 12,13. As illustrated in FIGS. 3–17, the oxygen inlet 31 and fuel inlet 32 comprise openings in the same flat rear face 33 of the control body 11. A third opening in the flat rear face 33 is sealed with a plug 34.

From the fuel gas inlet 32, the fuel gas is advanced to a fuel throttle valve 35. The throttle valve is of a conventional type known in the industry and includes a sealing element such as a ball bearing connected to a rotary knob 36. The knob 36, as can be seen in FIG. 2, is received on threads 37 and the operator can selectively throttle the amount of fuel gas passing through the valve 35 by screwing the knob 36 in or out such that the sealing element is positioned relative to a valve seat. The fuel throttle valve is mounted within a chamber 39 formed in the control body 11, as can be seen in FIG. 3.

Figure 9:
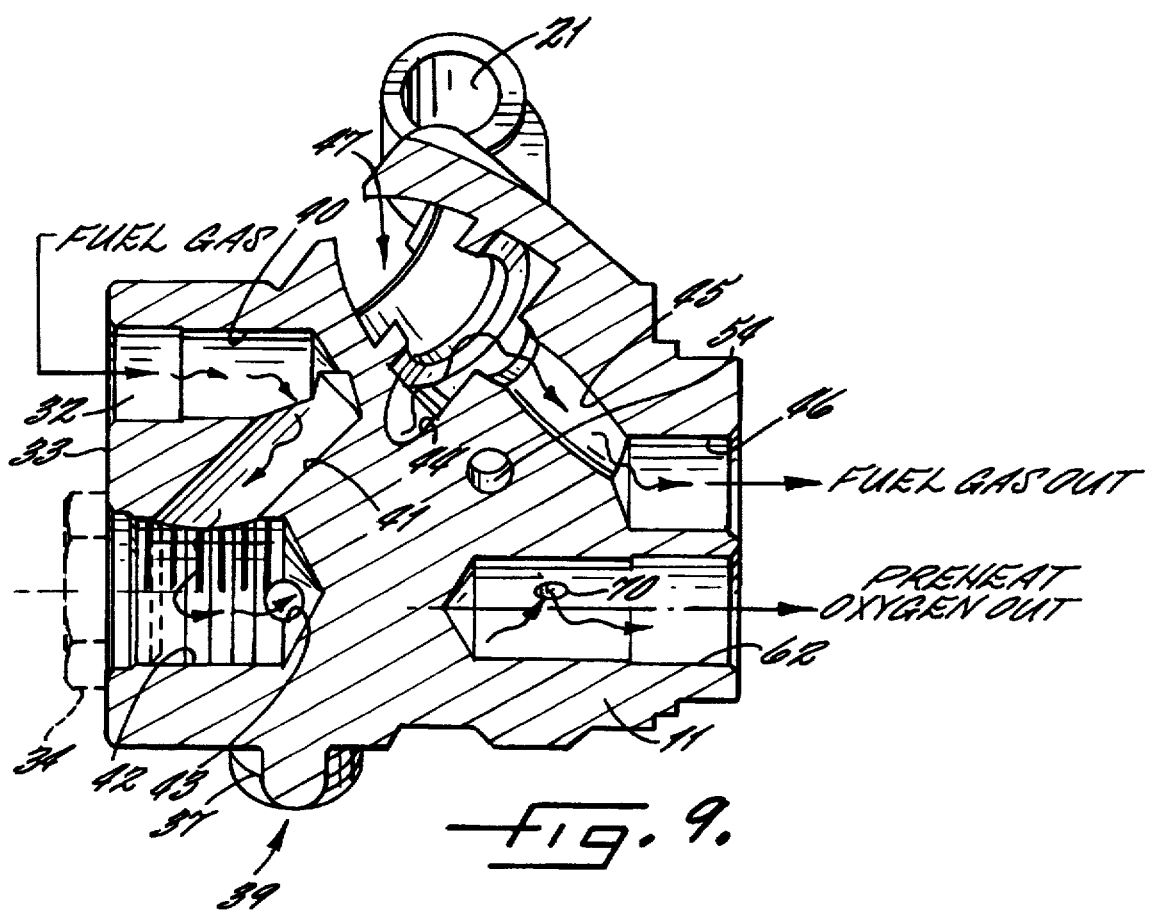
FIG. 9 is a sectional view of the control body taken along lines 9—9 of FIG. 5.
Figure 10:
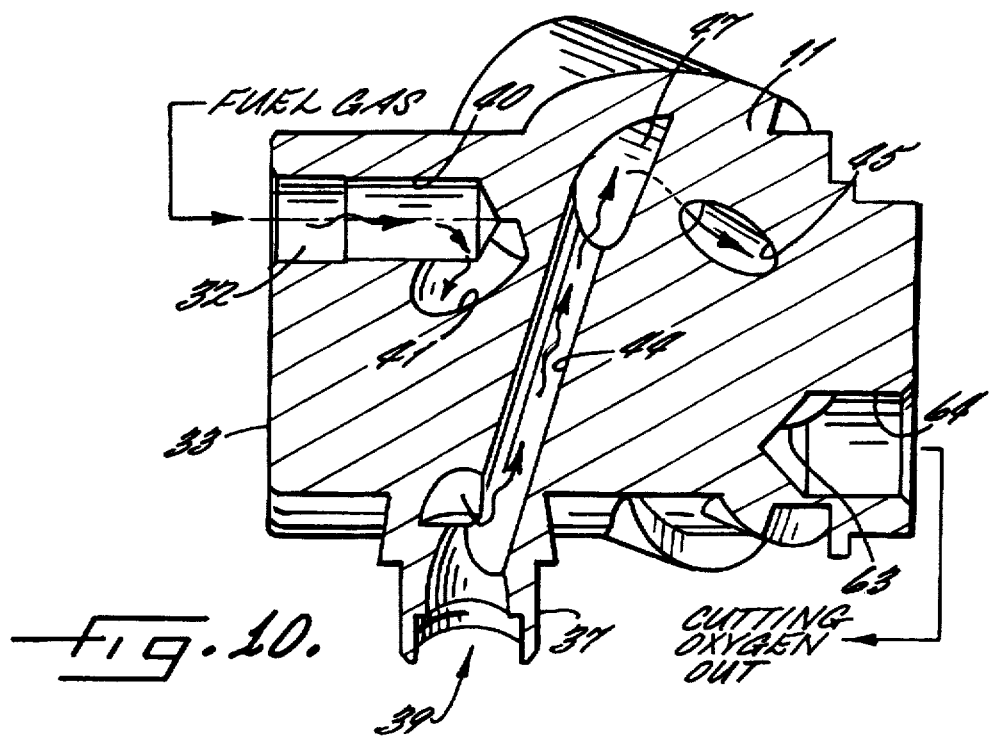
FIG. 10 is a sectional view of the control body taken along lines 10—10 of FIG. 5.

As shown schematically in FIG. 20, the fuel gas inlet 32 leads to a fuel passage 38 which extends through the control body 11 to the cutting nozzle 14. In particular, the fuel passage 38 includes a first section 40 as illustrated in FIG. 9. A second section 41 extends downwardly to a chamber 42 behind the plug 34. From the chamber 42, the fuel passage extends through a third section 43, best seen in FIGS. 11 and 13, which terminates at the fuel throttle valve chamber 39. The throttle valve 35 meters the desired amount of fuel gas through the chamber 39 which is then directed into a fourth section 44, as best seen in FIG. 9. The fourth section 44 leads to a cavity 47 on the upstream side of the fuel flow valve 23, which can be best seen in FIG. 9.

FIG. 20 illustrates that the fuel flow valve 23 includes the pilot bore 30 discussed above. Such a valve is similar to the type of valve illustrated in U.S. Pat. No. 5,383,650 to Bissonnette, which is herein incorporated by reference, and allows a predetermined restricted flow of fuel to pass through the valve 23 even when the valve is closed. As such, the pilot bore 30 creates a fuel bypass channel connecting the upstream and downstream sides of the fuel flow valve 23. After the fuel flow valve 23, the fuel passage 38 includes a fifth section 45, best seen in FIGS. 9 and 15, which is inclined downwardly and connects to a fuel outlet 46. The fuel outlet 46 is connected to a respective one of the tubes 15.

FIG. 20 illustrates an oxygen passage 50 which extends through the control body 11 from the oxygen inlet 31. The structure of the oxygen passage 50 is illustrated in part by FIG. 11 and includes a first section 51 extending from the inlet 31 to a chamber 48 on the upstream side of the oxygen flow valve 22.

Immediately upstream of the oxygen flow valve 22, the oxygen passage 50 divides into a preheat oxygen supply branch 52 and cutting oxygen supply branch 53, as best seen schematically in FIG. 20. With reference to the particular embodiment of FIGS. 3–17, the preheat oxygen supply branch 52 comprises a first section 54 extending to a throttle valve 55 having a chamber 56, as best seen in FIG. 12. The oxygen throttle valve 55 is of the same type as the fuel throttle valve 35 and can be adjusted by way of a threaded knob 60. From the chamber 56 of the oxygen throttle valve 55, the preheat oxygen supply branch extends through a second section 61 to a preheat oxygen outlet 62, visible in FIGS. 12 and 14. The preheat oxygen outlet 62 is also connected to a respective one of the tubes 15.

Figure 11:
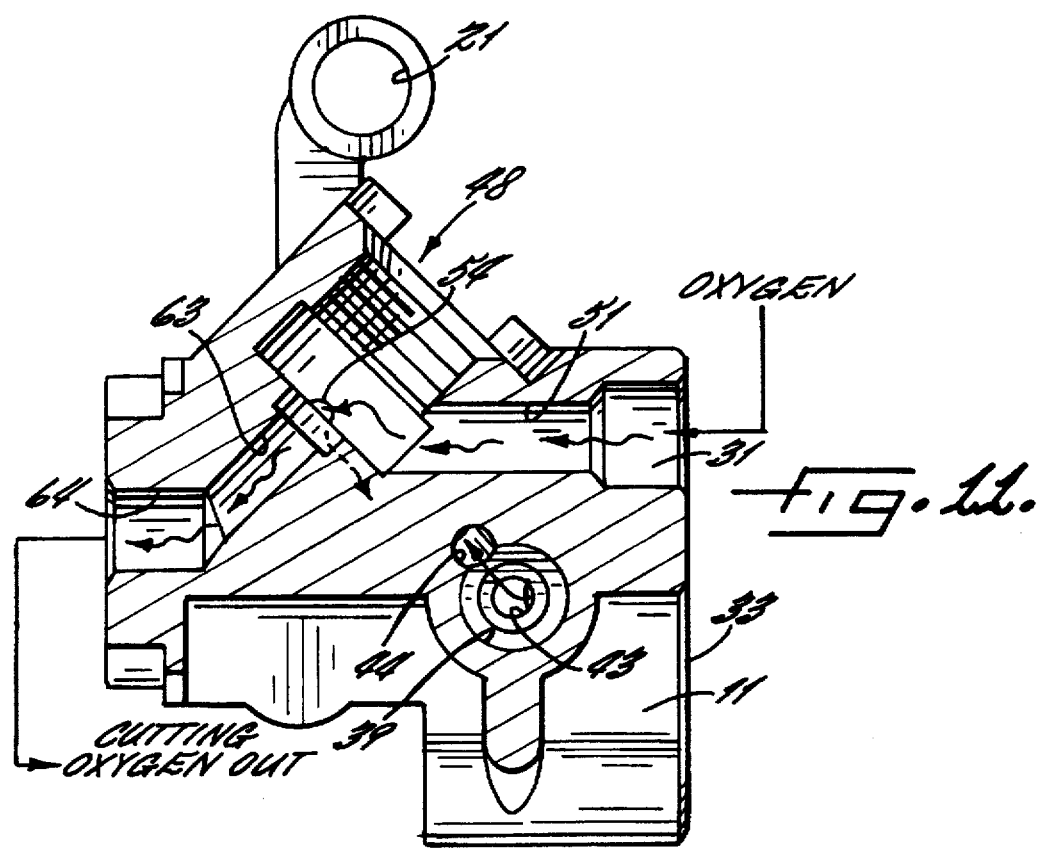
FIG. 11 is a sectional view taken lines 11—11 of FIG. 7.
Figure 12:
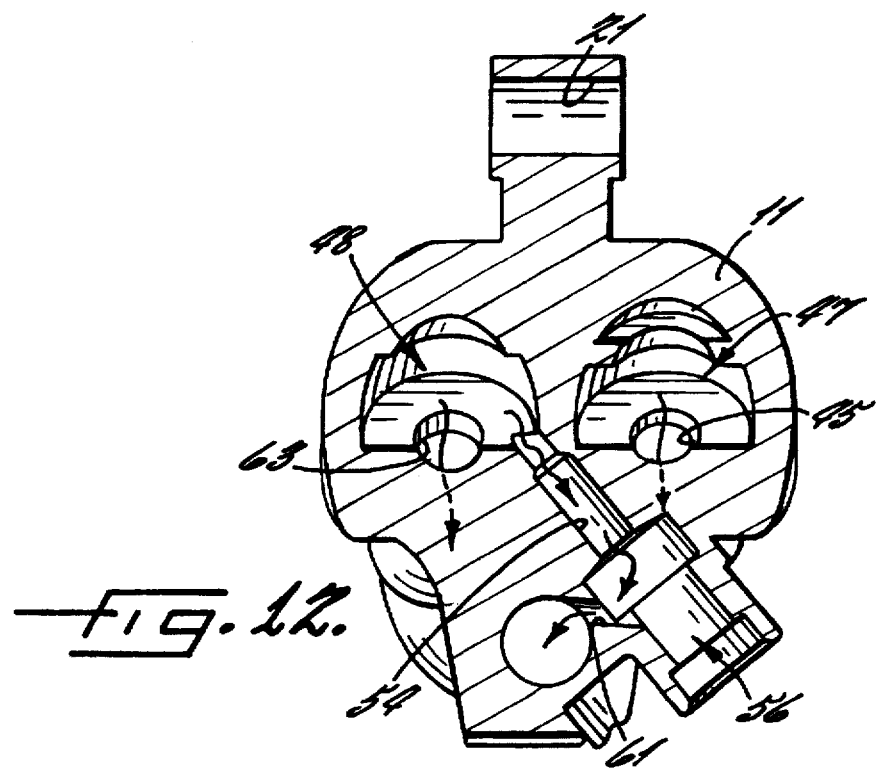
FIG. 12 is a sectional view of the control body taken along lines 12—12 of FIG. 8.
Figure 13:
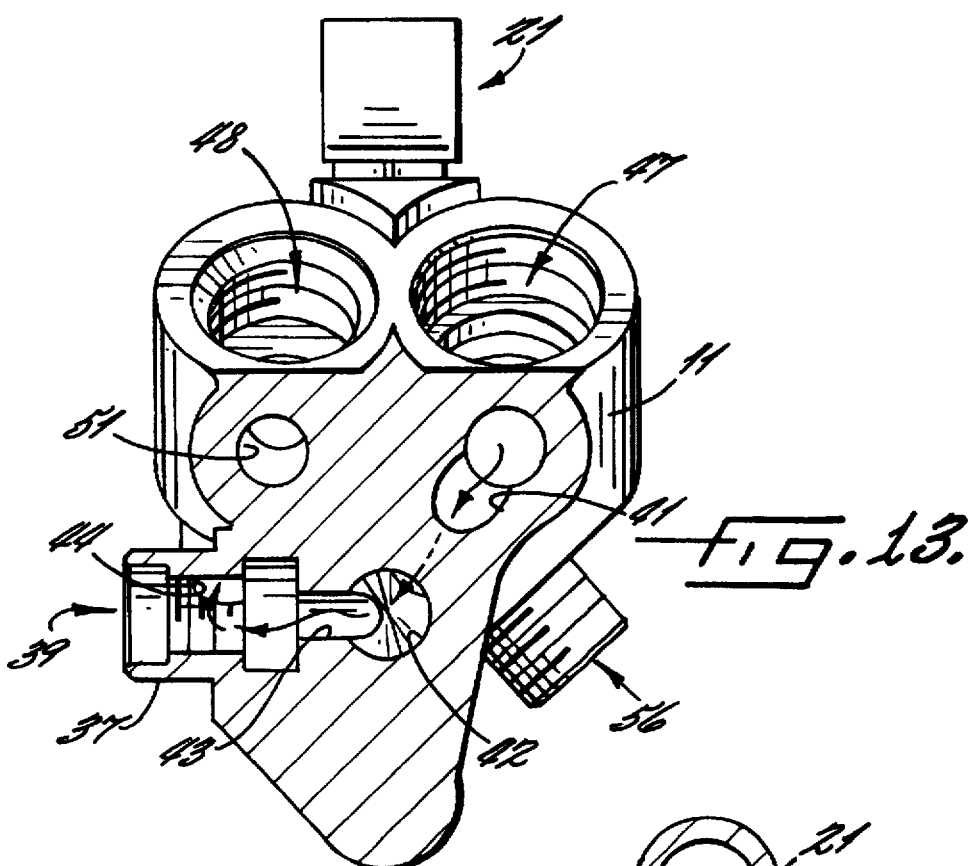
FIG. 13 is a sectional view of the control body taken along lines 13—13 of FIG. 7.
Figure 14:
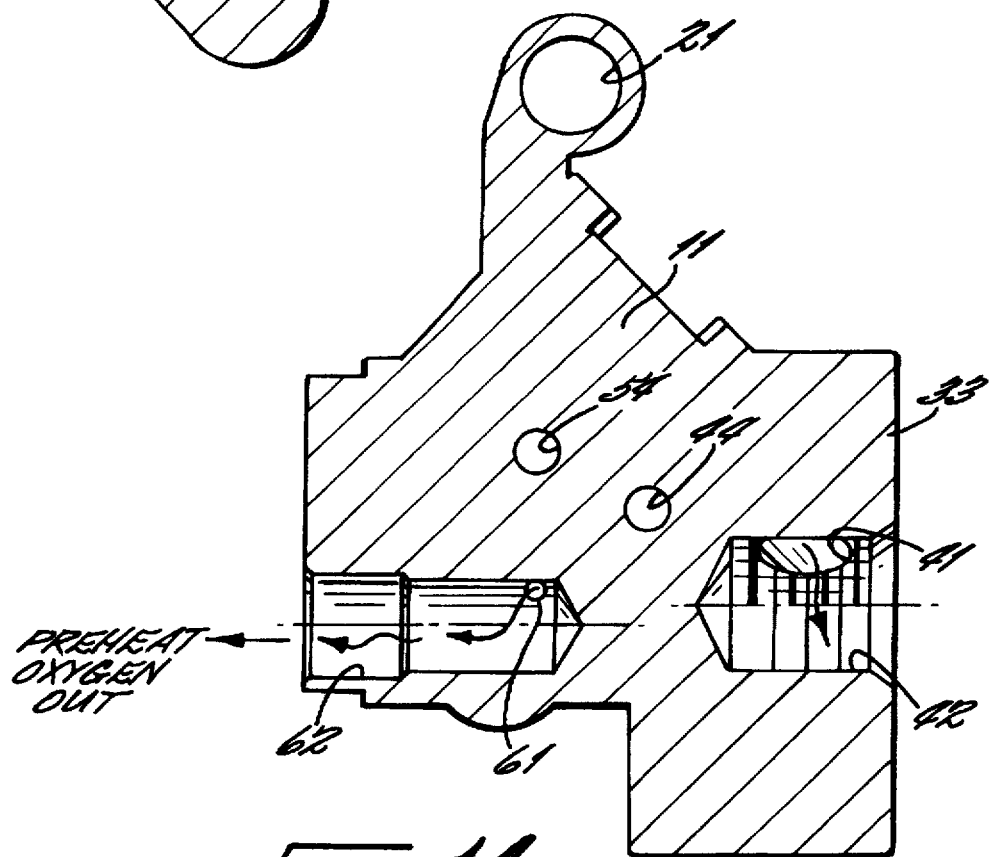
FIG. 14 is a sectional view taken along lines 14—14 of FIG. 7.
Figure 28:
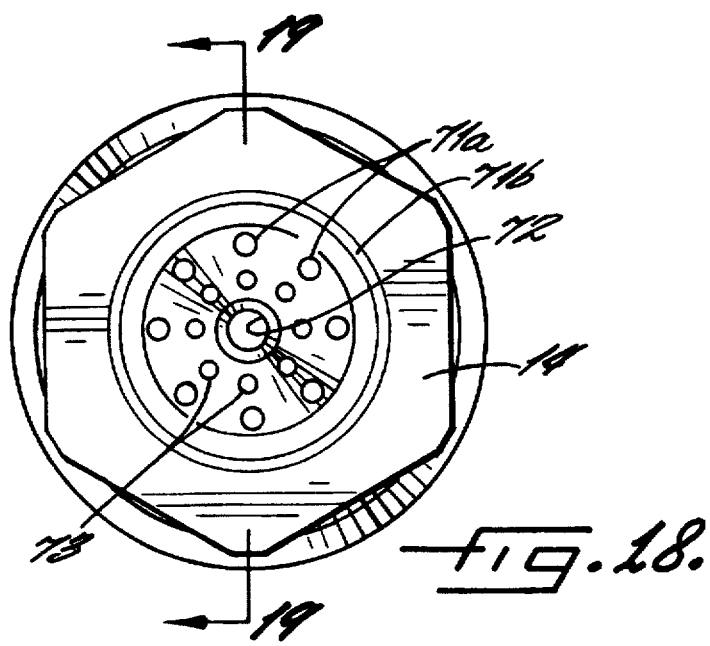
Figure 29:
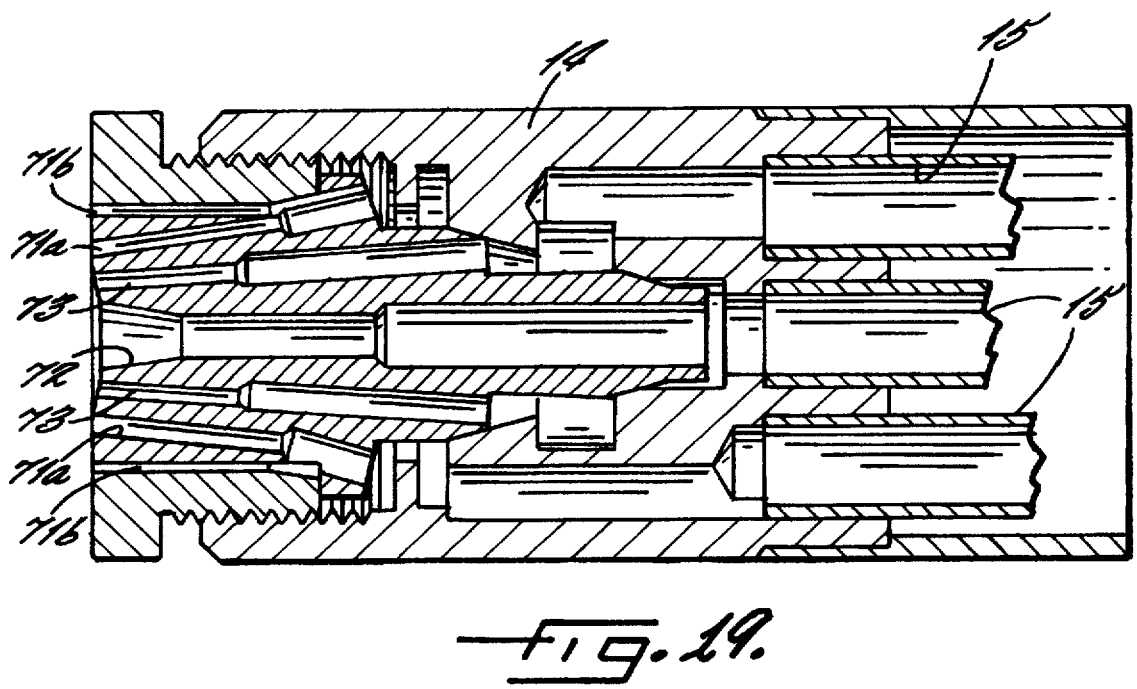

The cutting oxygen supply branch 53 extends from the chamber 48 of the oxygen flow valve 22 by way of a first section 63, illustrated in FIGS. 11 and 15, which leads to a cutting oxygen outlet 64. The cutting oxygen outlet 64 is also connected to one of the tubes 15.

A highly advantageous feature of the present invention is an interconnecting passage 70 which extends between the preheat oxygen supply branch 52 and the cutting oxygen supply branch 53. The interconnecting passage 70 can be seen schematically in FIG. 20 and in the physical embodiment in FIG. 16. The interconnecting passage 70 causes oxygen to be communicated between the preheat oxygen supply branch 52 and the cutting oxygen supply branch 53 during both the pilot mode and the preheat/cutting mode.

A preferred nozzle construction is illustrated in FIGS. 18 and 19 which is of the type disclosed in U.S. Pat. No. 4,455,176 to Fuhrhop, which is incorporated herein by reference. The cutting nozzle 14 is connected to the tubes 15 extending from the control body 11 and includes one or more preheat oxygen apertures 71a,71b, cutting oxygen apertures 72 and fuel apertures 73 arranged about the central axis of the nozzle. In particular, the cutting nozzle 14 includes one central cutting oxygen aperture 72 and a plurality of fuel gas apertures 73 radially spaced from and surrounding the central cutting oxygen aperture. The preheat oxygen apertures 71a,71b are radially spaced outwardly from the fuel apertures 73 and include a plurality of discrete openings 71a in the face of the nozzle 14 and a continuous annular aperture 71b surrounding the openings 71a. Because of the interconnecting passage 70 in the control body 11, the nozzle 14 does require the added complexity and cost of the channel extending between the preheat and cutting oxygen apertures, discussed by the Fuhrhop patent, in order to operate in a combined preheat/cutting mode.

The operation of the cutting torch 10 according to the present invention will now be described with reference to FIG. 20. In particular, to initiate operation, the fuel throttle valve 35 and oxygen throttle valve 55 are opened while the oxygen flow valve 22 and the fuel flow valve 23 are in the closed position. Accordingly, fuel flows along the fuel passage 38 and through the fuel throttle valve 35 and the bypass channel defined by pilot bore 30 in the fuel valve stem 25 to the fuel outlet 46, whereupon it passes through the tube 15 to the cutting nozzle 14. The pilot bore 30 is of a predetermined size and geometry to allow a restricted flow of fuel therethrough sufficient to maintain a pilot flame.

The oxygen passes into the oxygen passage 50 through the oxygen inlet 31. Because the oxygen flow valve 22 is closed, the entirety of the oxygen is directed into the preheat oxygen supply branch 52. The oxygen throttle valve 55 is adjusted by the operator so that a predetermined restricted flow of oxygen passes therethrough. The oxygen stream is then divided with a portion passing through the preheat oxygen outlet 62 to the preheat oxygen apertures 71a,71b of the cutting nozzle 14 through a tube 15. The other portion is passed through the interconnecting passage 70 whereupon it exits the control body 11 through the cutting oxygen outlet 64 and is directed through another tube 15 to the cutting oxygen apertures 72 of the cutting nozzle 14. The gases are ignited either manually or with an automatic ignition system thus forming a pilot flame which burns using the fuel gas and the two separate streams of oxygen flowing from the respective apertures.

To operate the torch in the preheat/cutting mode, the operator depresses the cutting lever 20 at one end which raises the valve stems 22,23 at the other end to open the oxygen flow valve 22 and fuel flow valve 23. This causes a much larger flow of fuel through the fuel passage 38 and oxygen passage 50. In addition, a portion of the oxygen from the oxygen inlet 31 is directed into the cutting oxygen branch 53 because the oxygen flow valve 22 is opened. A portion of this oxygen may in turn be directed through the interconnecting passage 70 into the preheat oxygen supply branch 52. Accordingly, a much higher flow volume of oxygen passes through both the preheat oxygen outlet 62 and the cutting oxygen outlet 64.

Thus, the torch operates in a combined preheat/cutting mode with oxygen always travelling through both the preheat oxygen passages and the cutting oxygen passages. The benefits of having a combined preheat/cutting mode are realized by the present invention; namely, the use of only two flow control valves instead of three as disclosed by the Bissonnette. In addition, however, the cutting torch is also capable of operating in a pilot mode to effect a fuel gas savings because the torch does not always have to be burning at full preheat/cutting intensity. Moreover, the cutting torch is capable of operating in a combined preheat/cutting mode with oxygen apertures both concentrically inside and outside of the annular fuel apertures, which helps maintain a stable flame, but without the additional passageway in the nozzle discussed by the Fuhrhop patent. The result is a highly efficient and valuable cutting torch which performs cutting operations with minimal cost and complexity.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A post-mixed cutting torch selectively operable in a pilot mode and a cutting mode, said torch comprising:

a control body having an oxygen inlet and a fuel inlet each configured to engage with respective ones of an oxygen supply and a fuel supply, and further having a preheat oxygen outlet, a cutting oxygen outlet, and a fuel outlet, said control body defining a plurality of passages between said inlets and said outlets, said passages comprising:

an oxygen passage having first and second ends, said first end in fluid communication with said oxygen inlet, said second end including a preheat oxygen supply branch terminating at said preheat oxygen outlet and a cutting oxygen supply branch terminating at said cutting oxygen outlet;

an interconnecting passage disposed between and connecting said preheat oxygen supply branch and said cutting oxygen supply branch; and a fuel passage extending between said fuel inlet and said fuel outlet;

an oxygen flow valve positioned in said oxygen passage for controlling the flow of oxygen therethrough, said oxygen flow valve having a cutting mode wherein said valve is opened and a pilot mode wherein said valve is closed and a restricted flow of oxygen is bypassed through an oxygen bypass channel having an upstream end and a downstream end on respective sides of said oxygen flow valve;

a fuel flow valve positioned in said fuel passage, said fuel flow valve having a cutting mode wherein said valve is opened and a pilot mode wherein said valve is closed and a restricted flow of fuel is bypassed through a fuel bypass channel having an upstream end and a downstream end on respective sides of said fuel flow valve; and a cutting nozzle connected to said control body and having at least one preheat oxygen aperture supplied by said preheat oxygen outlet, at least one cutting oxygen aperture supplied by said cutting oxygen outlet and at least one fuel aperture supplied by said fuel outlet.

2. A cutting torch according to claim 1 wherein said oxygen flow valve is positioned in said cutting oxygen supply branch and said oxygen bypass channel comprises at least part of said preheat oxygen supply branch and said interconnecting passage.

3. A cutting torch according to claim 1 further comprising a oxygen throttle valve positioned in said preheat oxygen supply branch upstream of said interconnecting passage for adjusting the flow of oxygen through said preheat oxygen supply branch.

4. A cutting torch according to claim 1 wherein said fuel bypass channel comprises a pilot bore extending through said fuel flow valve.

5. A cutting torch according to claim 1 wherein said fuel passage includes a fuel throttle valve upstream of said fuel flow valve.

6. A cutting torch according to claim 1 wherein said at least one cutting oxygen aperture comprises a central aperture in said nozzle, said at least one fuel aperture comprises an annular aperture surrounding said central cutting oxygen aperture, and said at least one preheat oxygen aperture comprises an annular aperture surrounding said fuel aperture.

7. A cutting torch according to claim 1 further comprising a cutting lever attached to both of said oxygen flow valve and said fuel flow valve such that said fuel and oxygen valves are opened substantially simultaneously by said cutting lever.

8. A cutting torch according to claim 1 further comprising three substantially rigid tubes extending between and connecting each of the preheat oxygen, cutting oxygen and fuel outlets of said control body with the respective apertures in said nozzle, said tubes being arranged in a triangular truss configuration and being fastened together at at least one point between said control body and said nozzle for structural rigidity.

9. A gas flow control assembly for selectively operating a post-mixed cutting torch in a pilot mode and a cutting mode, said gas flow control assembly comprising:

a control body having an oxygen inlet and a fuel inlet each configured to engage with respective ones of an oxygen supply and a fuel supply, and further having a preheat oxygen outlet, a cutting oxygen outlet, and a fuel outlet, said control body defining a plurality of passages between said inlets and said outlets, said passages comprising:
an oxygen passage having first and second ends, said first end in fluid communication with said oxygen inlet, said second end including a preheat oxygen supply branch terminating at said preheat oxygen outlet and a cutting oxygen supply branch terminating at said cutting oxygen outlet;
an interconnecting passage disposed between and connecting said preheat oxygen supply branch and said cutting oxygen supply branch; and
a fuel passage extending between said fuel inlet and said fuel outlet;

an oxygen flow valve positioned in said oxygen passage for controlling the flow of oxygen therethrough, said oxygen flow valve having a cutting mode wherein said valve is opened and a pilot mode wherein said oxygen flow valve is closed and a restricted flow of oxygen is bypassed through an oxygen bypass channel having an upstream end and a downstream end on respective sides of said oxygen flow valve; and a fuel flow valve positioned in said fuel passage, said fuel flow valve having a cutting mode wherein said valve is opened and a pilot mode wherein said fuel flow valve is closed and a restricted flow of fuel is bypassed through a fuel bypass channel having an upstream end and a downstream end on respective sides of said fuel flow valve.

10. A cutting torch according to claim 9 wherein said oxygen flow valve is positioned in said cutting oxygen supply branch and said oxygen bypass channel comprises said at least part of said preheat oxygen supply branch and said interconnecting passage.

11. A cutting torch according to claim 9 further comprising a oxygen throttle valve positioned in said preheat oxygen supply branch upstream of said interconnecting passage for adjusting the flow of oxygen through said preheat oxygen supply branch.

12. A cutting torch according to claim 9 wherein said fuel bypass channel comprises a pilot bore extending through said fuel flow valve.

13. A cutting torch according to claim 9 wherein said fuel passage includes a fuel throttle valve upstream of said fuel flow valve.

14. A post-mixed cutting torch, said torch comprising:

a control body having an oxygen inlet and a fuel inlet each configured to engage with respective ones of an oxygen supply and a fuel supply, and further having a first oxygen outlet, a second oxygen outlet, and a fuel outlet, said control body defining a plurality of passages between said inlets and said outlets, said passages comprising:
an oxygen passage having first and second ends, said first end in fluid communication with said oxygen inlet, said second end including a first oxygen supply branch terminating at said first oxygen outlet and a second oxygen supply branch terminating at said second oxygen outlet;
an interconnecting passage disposed between and connecting said first oxygen supply branch and said second oxygen supply branch; and
a fuel passage extending between said fuel inlet and said fuel outlet;

an oxygen flow valve positioned in said oxygen passage for controlling the flow of oxygen therethrough such that a flow of oxygen is directed through both of said first and second oxygen supply branches via said interconnecting passage when said valve is opened;

a fuel flow valve positioned in said fuel passage for controlling the flow of fuel therethrough; and a cutting nozzle connected to said control body and defining a central axis, said cutting nozzle further defining at least one central oxygen aperture supplied by said first oxygen outlet, at least one fuel aperture radially spaced from said central oxygen aperture and supplied by said fuel outlet, and at least one other oxygen aperture radially spaced outwardly from said fuel aperture and supplied by said second oxygen outlet.

15. A cutting torch according to claim 14 wherein said oxygen flow valve is positioned in said first oxygen supply branch.

16. A cutting torch according to claim 14 further comprising a oxygen throttle valve positioned in said second oxygen supply branch upstream of said interconnecting passage for adjusting the flow of oxygen through said second oxygen supply branch.

17. A cutting torch according to claim 15 further comprising a fuel bypass channel defining a pilot bore of predetermined size extending through said fuel flow valve and an oxygen bypass channel around said oxygen flow valve comprising at least part of said second oxygen supply branch and said interconnecting passage such that said cutting torch is operable in a pilot mode when both of said fuel flow valve and said oxygen flow valve are closed.

18. A cutting torch according to claim 14 wherein said fuel passage includes a fuel throttle valve upstream of said fuel flow valve.

19. A cutting torch according to claim 14 further comprising a cutting lever attached to both of said oxygen flow valve and said fuel flow valve such that said fuel and oxygen valves are opened substantially simultaneously by said cutting lever.

20. A cutting torch according to claim 14 further comprising three substantially rigid tubes extending between and connecting each of the first oxygen, second oxygen and fuel outlets of said control body with the respective apertures in said nozzle, said tubes being arranged in a triangular truss configuration and being fastened together at at least one point between said control body and said nozzle for structural rigidity.

21. A method of operating a cutting torch comprising the steps of:
   a) operating the torch in a pilot mode including;
      directing a restricted flow of fuel through at least one annular fuel aperture of a cutting nozzle,
      directing a restricted flow of oxygen through at least one central cutting oxygen aperture of the nozzle which is concentrically within the fuel aperture,
      directing a restricted flow of oxygen through at least one outer annular preheat oxygen aperture which is concentrically outside of the annular fuel aperture, and
      igniting the flows of fuel and oxygen to create a pilot flame,
   b) operating the torch in a cutting mode including;
      opening a valve for directing a larger flow of fuel through the annular fuel aperture, and
      opening a valve for directing a larger flow of oxygen through both the central cutting oxygen aperture and outer annular preheat oxygen aperture, and
   c) positioning the cutting nozzle adjacent a workpiece during the operation in the cutting mode to cut the workpiece.

22. A method according to claim 21 wherein said valve opening steps are performed simultaneously.

23. A method according to claim 21 wherein said step opening a valve for fuel flow is performed before said step of opening a valve for oxygen flow.

* * * * *